3,121,044
THREE-LAYER COMPRESSED PENICILLIN TABLET
Frank H. Buckwalter, De Witt, Alphonse P. Granatek, Syracuse, and Michael P. De Murio, De Witt, N.Y., assignors, by mesne assignments, to Beecham Research Laboratories Limited, Brentford, Middlesex, England, a corporation of Great Britain and Northern Ireland
No Drawing. Filed Oct. 6, 1960, Ser. No. 60,786
1 Claim. (Cl. 167—82)

This invention relates to an oral tablet comprised of a combination of therapeutic agents for use in the treatment of infections.

The use of a combination of aspirin (acetylsalicylic acid), phenacetin (acetophenetidine) and caffeine as an analgesic in the relief of pain and discomfort caused by the common cold and as an antipyretic in reducing fevers is well-known. Such compositions are readily available on the market under a variety of trade names. However, the relief provided by such preparations is symptomatic and therefore, only temporary. They are not effective in preventing or curing infections. Moreover, they are not effective in the treatment of allergic manifestations which are caused by the liberation of histamine into the tissues of man nor do they offer any decongestant relief.

It is an object of this invention to provide a therapeutic tablet which simultaneously provides symptomatic relief for allergic manifestations and for the discomforts which accompany infections and also is effective in combating such infections and in preventing further infections.

It is a further object of this invention to provide an antihistamine, analgesic, decongestant, antibiotic tablet which does not produce the undesirable side effects which normally are associated with the administration of antiallergies, decongestants and antibiotics.

It is a further object of this invention to provide a therapeutic tablet which will disintegrate rapidly and which will result in high blood levels when administered orally.

It is a still further object of this invention to provide a therapeutic tablet comprising a combination of ingredients which is characterized by the stability of all its ingredients.

Briefly, the objects of this invention are attained by producing a therapeutic tablet comprising from about 60 to 140 mg. of a nontoxic salt of alpha-phenoxyethylpenicillin, such as the ammonium salt or a salt of an amine such as trialkylamines, including triethylamine, procaine, dibenzylamine, N-benzyl-beta-phenethylamine, 1-ephenamine, N,N' - dibenzylethylenediamine, dehydroabietylamine, N,N' - bis - dehydroabietylethylenediamine, N-(lower)alkylpiperidines, e.g., N-ethylpiperidine, or an alkali metal salt thereof and preferably potassium alpha-phenoxyethylpenicillin; from about 165 to 250 mg. of acetylsalicylic acid; from about 15 to 30 mg. of caffeine; from about 120 to 150 mg. of phenacetin and about 25 mg. of phenyltoloxamine dihydrogen citrate. When it is desired to provide added decongestant relief, the 25 mg. of phenyltoloxamine dihydrogen citrate may be replaced with about 10 to 20 mg. of phenylpropanolamine hydrochloride, from about 2.5 to 5 mg. of phenylephrine hydrochloride, from about 3.75 to 7.5 mg. of phenyltoloxamine dihydrogen citrate and from about 1.25 to 2.5 mg. of chlorpheniramine maleate or carbinoxamine maleate.

The preferred composition of this invention, when decongestant action is not required, comprises about 125 mg. of potassium alpha-phenoxyethyl penicillin; about 210 mg. of acetylsalicylic acid; about 150 mg. of phenacetin; about 15 mg. of caffeine; and about 25 mg. of phenyltoloxamine dihydrogen citrate.

When decongestant action is desired, the preferred composition comprises about 125 mg. of potasium alpha-phenoxyethylpenicillin; about 166 mg. of acetylsalicylic acid; about 120 mg. of phenacetin; about 30 mg. of caffeine; about 5 mg. of phenylephrine hydrochloride; about 20 mg. of phenylpropanolamine hydrochloride; about 7.5 mg. of phenyltoloxamine dihydrogen citrate; and about 2.5 mg. of chlorpheniramine maleate.

In order to be stable, the therapeutic tablets of this invention should be provided in the form of a multi-layer tablet. The composition of each layer, which may contain one or more of the therapeutic ingredients, is separately prepared and the layers are subsequently formed into a tablet by conventional means such as in a Colton layer machine. In the preferred embodiment of this invention, the tablet is in the form of a three-layer tablet.

The therapeutic ingredients which comprise the tablets of this invention may be compounded with inert ingredients or other adjuvants in the preparation of the tablets. Thus, they may be mixed with fillers, sweeteners, binders, flavoring agents, coloring agents, etc. As examples of some of the compounds which may be compounded with the therapeutic ingredients, they may be mentioned sucrose, lactose, starch, gelatin, calcium phosphate magnesium stearate, talc, kaolin, titanium dioxide, aluminum stearate, wax, any of the F, D, & C dyes, etc.

The therapeutic tablets of this invention are characterized by a high stability of all the active ingredients even after long periods of storing. This is particularly surprising in view of the fact that both aspirin and penicillins have, in the past, tended to deteriorate and hence lose their effectiveness over long periods of time.

When the therapeutic tablets of this invention are taken orally they disintegrate very rapidly. The aspirin, phenacetin and caffeine are quickly absorbed by the body and afford symptomatic relief in a short time. The nontoxic salt of alpha-phenoxyethylpenicillin rapidly dissolves in the blood stream and the blood level which is attained in a short time is considerably higher than previously been encountered in oral administrations of penicillins. The action of the salt of alpha-phenoxyethylpenicillin is effective in curing respiratory infections caused by beta hemolytic streptococcus, e.g., pharyngitis and tonsillitis, but is also markedly effective in preventing further, more serious infections which are often complications of such infections, e.g., glomerulonephritis and rheumatic fever. Moreover, the incidence of undesirable reactions following treatment with these tablets is far lower than is normally encountered in the penicillin treatment of such infections. Allergic manifestations which often accompany infections, are quickly brought under control by the ingestion of the tablets of this invention. When the tablets contain decongestant additives as hereinabove described, mucosal swellings which often accompany infections are reduced. Moreover, the use of these tablets does not elicit any of the undesirable side reactions, such as sedation or hypertension, which so often accompany the administration of anti-allergics and decongestants.

The relief afforded by the novel tablets of this invention is not merely an additive effect of each of the ingredients as might be expected. It has been found that all the therapeutic ingredients cooperate synergistically to give much greater and more complete relief than would be expected from the total effects of each component taken separately.

The following examples are illustrative of this invention.

EXAMPLE 1

This example illustrates the preparation of a triple layer tablet. The bottom layer was prepared by intimately mixing 210 grams of acetylsalicylic acid, 0.04 gram of F. D. & C. Yellow No. 5 (tartrazine) 30 grams of corn starch and 10 grams of talc. This mixture was put through a hammer mill and sufficiently chloroform was added to obtain a wet granulation. The granules were reduced to a 20 to 40 mesh and were allowed to dry overnight in an oven at 120° to 140° F.

The middle layer was prepared by mixing together 150 grams of phenacetin, 15 grams of caffeine and 25 grams of phenyltoloxamine dihydrogen citrate in a pony mixer. A paste was prepared separately by mixing 4 grams of corn starch and 0.4 gram of powdered sugar with 3.3 grams of distilled water and heating. This paste was added to the dry mixture in the pony mixer to form a granulation. The granules were dried overnight in an oven at 120 to 140° F. and reduced to about 20 mesh. There was then added 3 grams of magnesium stearate and the composition was intimately mixed.

The top layer was prepared by mixing 125 grams of potassium alpha-phenoxyethylpenicillin and 0.03 gram F. D. & C. Red No. 3 (erythrosine). This mixture was passed through a hammer mill. Sufficient chloroform (about 550 cc.) was added to form a hard rubbery mass. This mass was broken up and dried overnight at 120° F. It was then granulated to about 20 mesh. There was then added 3 grams of magnesium stearate and the composition was intimately mixed.

Each of the above mixtures was placed in a separate hopper on a three layer Colton tabletting machine. One thousand three-layer tablets were prepared. Each of the tablets contained as the active ingredients 0.125 gram of potassium alpha-phenoxy-ethyl penicillin, 0.210 gram of acetylsalicylic acid, 0.150 gram of phenacetin, 0.015 gram caffein and 0.025 gram of phenyltoloxamine dihydrogen citrate.

The following tables show the blood levels of potassium alpha-phenoxyethylpenicillin attained at different periods of time after the oral administration of a one tablet dose and a two tablet dose of the tablets prepared in Example 1.

Table I

[Dose: 1 tablet]

| Patient | Micrograms Potassium α-phenoxyethylpenicillin per ml. of Plasma | | | | | Statistics of Patient | | |
|---|---|---|---|---|---|---|---|---|
| | 0 Hour | ½ Hour | 1 Hour | 2 Hours | 4 Hours | age | Sex | Weight |
| A | 0 | 4.4 | 2.2 | 0.5 | 0.07 | 24 | M | 158 |
| B | 0 | 3.6 | 3.0 | 0.7 | 0.1 | 52 | F | 147 |
| C | 0 | 1.4 | 3.2 | 0.7 | 0.07 | 22 | M | 165 |
| D | 0 | 2.3 | 2.8 | 0.4 | 0.04 | 43 | F | 148 |
| E | 0 | 1.8 | 2.3 | 0.5 | 0.07 | 32 | M | 165 |
| F | 0 | 1.6 | 3.5 | 0.8 | 0.06 | 38 | F | 100 |
| G | 0 | 2.9 | 1.9 | 0.5 | 0.04 | 58 | F | 170 |
| H | 0 | 2.0 | 2.8 | 0.6 | 0.07 | 30 | M | 135 |
| I | 0 | 2.8 | 2.1 | 0.3 | 0.04 | 20 | M | 170 |
| J | 0 | 0.7 | 2.8 | 1.1 | 0.01 | 23 | F | 175 |
| Average | 0 | 2.35 | 2.66 | 0.61 | 0.066 | | | |

Table II

[Dose: 2 tablets]

| Patient | Micrograms Potassium α-phenoxyethylpenicillin per ml. of Plasma | | | | | Statistics of Patient | | |
|---|---|---|---|---|---|---|---|---|
| | ½ Hour | 1 Hour | 2 Hour | 4 Hours | 6 Hours | age | Sex | Weight |
| A | 4.7 | 4.2 | 1.4 | 0.1 | 0.02 | 24 | M | 175 |
| B | 3.2 | 4.2 | 1.3 | 0.1 | 0.02 | 21 | M | 160 |
| C | 0.3 | 0.7 | 1.5 | 0.5 | 0.06 | 45 | F | 140 |
| D | 4.8 | 4.5 | 1.3 | 0.1 | 0.02 | 21 | M | 178 |
| E | 6.5 | 5.4 | 1.4 | | 0.02 | 43 | F | 145 |
| F | 2.5 | 4.6 | 1.7 | 0.1 | 0.07 | 23 | M | 180 |
| G | 2.6 | 3.4 | 1.3 | 0.2 | 0.02 | 25 | M | 150 |
| H | 0.8 | 1.1 | 1.9 | 0.2 | 0.08 | 22 | M | 185 |
| I | 0.4 | 2.1 | 2.7 | 0.3 | 0.06 | 44 | F | 104 |
| J | 2.7 | 6.6 | 2.0 | 0.1 | 0.02 | 21 | M | 165 |
| Average | 2.85 | 3.68 | 1.65 | 0.10 | 0.03 | | | |

The indicated blod levels are higher than have previously been attained by the oral administartion of comparable doseages of penicillin.

EXAMPLE 2

The procedure of Example 1 was repeated using, instead of the respective amounts described therein, 138 grams of potassium alpha-phenoxyethylpenicillin, 166 grams of acetylsalicylic acid, 120 grams of phenacetin and 30 grams of caffein. Both the aspirin and the penicillin content of the tablet remained stable even after being stored for long periods of time.

EXAMPLE 3

This example illustrates the preparation of a triple layer tablet which will provide decongestant relief as well as symptomatic relief and antibiotic protection. The technique used for preparing the granules for each of the three layers was essentially the same as that described in Example 1, above.

The composition of the first layer was formed by preparing granules of from 20 to 40 mesh. The total composition of this layer comprised 38.16 grams of lactose, 23.03 grams of corn starch, 20.4 grams of monocalcium phosphate, 20.4 grams of dicalcium phosphate and 125 grams of potassium alpha-phenoxyethyl penicillin.

For the second layer, granules of 30 mesh were prepared. The total composition of the second layer comprised 120 grams of phenacetin, 41 grams of sucrose, 26.8 grams of lactose, 6.7 grams of starch, 0.291 gram of gelatin, 0.287 gram of F. D. & C. Red No. 3, 0.0098 gram of F. D. & C. Yellow No. 5, 5 grams of phenylephrine hydrochloride, 20 grams of phenylpropanolamine hydrochloride, 7.5 grams of phenyltoloxamine dihydrogen citrate and 2.5 grams chlorpheniramine maleate.

The composition of the third layer was formed by preparing 20 to 40 mesh granules. The total composition comprised 166 grams of aspirin, 30 grams of caffeine, 5.499 grams of sucrose, 5.499 grams of lactose, 0.0008 gram F. D. & C. Red No. 3 and 0.00004 gram F. D. & C. Yellow No. 5.

Each of the above three granulations was placed in the first, second and third positions, respectively, on a Colton three layer tabletting machine. One thousand three-layer tablets were prepared. Each of the tablets contained as the active ingredients 0.125 gram of potassium alphaphenoxyethylpenicillin, 0.166 gram acetylsalicylic acid, 0.120 gram phenacetin, 0.030 gram caffeine, 0.005 gram phenylephrine hydrochloride, 0.020 gram of phenylpropanolamine hydrochloride, 0.0075 gram of phenyltoloxamine dihydrogen citrate and 0.0024 gram of chlorpheniramine maleate.

EXAMPLE 4

The procedure of Example 3 was repeated using, instead of the respective amounts described therein, 69 grams of potassium alpha-phenoxyethylpenicillin, 250 grams of acetylsalicylic acid, 150 grams phenacetin, 16 grams caffeine, 2.5 grams phenylephrine hydrochloride, 10 grams phenylpropanolamine hydrochloride, 3.75 grams phenyltoloxamine dihydrogen citrate and 1.25 grams chlorpheniramine maleate. The tablets thus obtained were effective in the treatment of infections accompanied by mucosal swelling.

What is claimed is:

A stable, compressed, three-layered therapeutic tablet comprising a bottom layer of about 210 mgm. acetylsalicylic acid, a middle layer of about 150 mgm. phenacetin, 15 mgm. caffeine and 25 mgm. phenyltoloxamine dihydrogen citrate and a top layer of about 125 mgm. potassium α-phenoxyethylpenicillin, said middle layer completely separating said top layer from said bottom layer.

References Cited in the file of this patent

UNITED STATES PATENTS

| | | |
|---|---|---|
| 2,723,938 | Buckwalter et al. | Nov. 15, 1955 |
| 2,744,895 | Johnson | May 8, 1956 |
| 2,756,226 | Brandl et al. | July 24, 1956 |
| 2,768,115 | Buckwalter et al. | Oct. 23, 1956 |
| 2,776,970 | Lintner | Jan. 8, 1957 |
| 2,791,609 | Kaplan | May 7, 1957 |
| 2,795,528 | Buckwalter et al. | June 11, 1957 |
| 2,798,443 | Martell | July 9, 1957 |
| 2,814,621 | Wheatley | Nov. 26, 1957 |
| 2,824,869 | Buckwalter et al. | Feb. 25, 1958 |
| 2,824,877 | Cheney et al. | Feb. 25, 1958 |
| 2,854,450 | Cheney et al. | Sept. 30, 1958 |
| 2,931,798 | Umezawa et al. | Apr. 5, 1960 |
| 2,944,493 | Bailey et al. | July 12, 1960 |
| 2,951,014 | Gorman | Aug. 30, 1960 |
| 2,951,792 | Swintosky | Sept. 6, 1960 |
| 2,965,541 | Byrnes | Dec. 20, 1960 |
| 2,991,226 | Millar et al. | July 4, 1961 |
| 2,994,639 | Carper et al. | Aug. 1, 1961 |
| 3,018,221 | Millar et al. | Jan. 23, 1962 |
| 3,048,526 | Boswell | Aug. 7, 1962 |

FOREIGN PATENTS

| | | |
|---|---|---|
| 759,577 | Great Britain | Oct. 17, 1956 |
| 767,153 | Great Britain | Jan. 30, 1957 |

OTHER REFERENCES

Physicians' Desk Reference (PDR), 12th ed., 1958, copyright 1957, pub. by Medical Economics, Inc. Oradell, N.J., p. 641, entry "Bristapen" (Bristol) and entry "Tetrex-APC with Bristamin" (Bristol).

"Naldecon" (Bristol) TM. 692,726, registered Feb. 9, 1960 (effective date of first use Apr. 7, 1959).

"Maxipen" (Pfizer) TM. 660,043, registered Apr. 1, 1958 (effective date of first use Mar. 14, 1957).

"Syncillin" (Bristol) TM. 697,704, registered Aug. 16, 1960 (effective date of first use Sept. 21, 1959).

"Syndecon" (Bristol) TM. 702,828, registered Aug. 16, 1960 (effective date of first use Jan. 8, 1960).

(A.D.I.) American Drug Index, 1960, copyright (Lib. Cong. Card. Cat. No. 55–6286), published Feb. 15, 1960, J. B. Lippincott Co., Philadelphia, Pa.—

Entries "A.P.C.—A.P. Cillin-200", pp. 67–68;
Entries "Chlorpheniramine Maleate, Chlorphenamine," pp. 166–167;
Entries "Clistinal, Clistin (R.A.) Maleate," p. 174;
Entries "Penicillin—Penicillin-V-Pot.," pp. 479–487;
Entry "Phenylephrine HCL," pp. 509–511;
Entry "Phenylpropanolamine HCL," pp. 512–513;
Entry "Phenyltoloxamine Dihydrogen Citrate," pp. 513–514.

"Chemipen" (Squibb) TM. 702,830, registered Aug. 16, 1960 (effective date of first use Feb. 11, 1960).

"Darcil (Wyeth) TM. 706,219, registered Oct. 25, 1960 (effective date of first use Feb. 19, 1960).

"Alpen" (Schering) TM. 707,736, registered Nov. 29, 1960 (effective date of first use Feb. 29, 1960).

"Dramcillin-S" (White) TM. 709,539, registered Jan. 10, 1961 (effective date of first use Apr. 13, 1960).

Criep et al.: "Allergy to Phenethicillin," New England J. of Medicine, vol. 263, No. 3, pp. 891–893, Nov. 3, 1960.

Martin et al.: "Penicillin V and Phenethicillin Potassium in Serum: Comparison of Concentrations and of Anti-bacterial Effects," Proc. Mayo Clinic, vol. 35, pp. 577–584, Sept. 28, 1960.

McCarthy et al.: "Absorption and Excretion of Four Penicillins: Penicillin G, Penicillin V, Phenethicillin and Phenylmercaptomethyl Penicillin," New England J. of Medicine, vol. 263, pp. 315–326, Aug. 18, 1960.

Kraushaar: "Microbiological and Pharmacological Studies on a New Penicillin (a-Methylphenoxymethylpencillin, a-phenoxyethylpenicillin, a-phenoxypropionamidopenicillanic acid), Arzneimittelforsch, vol. 10, pp. 419–423, June 1960.